United States Patent
Schnitzer et al.

(10) Patent No.: US 11,703,574 B2
(45) Date of Patent: Jul. 18, 2023

(54) METHOD AND DEVICE FOR SCANNING A SOLID ANGLE

(71) Applicant: Robert Bosch GmbH, Stuttgart (DE)

(72) Inventors: Reiner Schnitzer, Reutlingen (DE); Tobias Hipp, Hechingen (DE)

(73) Assignee: Robert Bosch GmbH, Stuttgart (DE)

( * ) Notice: Subject to any disclaimer, the term of this patent is extended or adjusted under 35 U.S.C. 154(b) by 737 days.

(21) Appl. No.: 16/495,271

(22) PCT Filed: Mar. 19, 2018

(86) PCT No.: PCT/EP2018/056845
§ 371 (c)(1),
(2) Date: Sep. 18, 2019

(87) PCT Pub. No.: WO2018/172260
PCT Pub. Date: Sep. 27, 2018

(65) Prior Publication Data
US 2020/0018859 A1    Jan. 16, 2020

(30) Foreign Application Priority Data
Mar. 20, 2017   (DE) .......................... 102017204587.6

(51) Int. Cl.
*G01S 7/484*        (2006.01)
*G01C 3/08*         (2006.01)
*G01S 17/89*        (2020.01)
*G01S 7/486*        (2020.01)

(52) U.S. Cl.
CPC ............... *G01S 7/484* (2013.01); *G01C 3/08* (2013.01); *G01S 17/89* (2013.01); *G01S 7/4868* (2013.01)

(58) Field of Classification Search
CPC . G01C 3/08; G01S 17/89; G01S 7/484; G01S 7/4868
See application file for complete search history.

(56) References Cited

U.S. PATENT DOCUMENTS 9,383,753 B1 *  7/2016  Templeton ............. G01S 17/42
2009/0273770 A1  11/2009  Bauhahn et al.
(Continued)

FOREIGN PATENT DOCUMENTS

| CN | 103576162 A | 2/2014 |
|----|-------------|--------|
| CN | 103975250 A | 8/2014 |
| CN | 105182361 A | 12/2015 |

(Continued)

OTHER PUBLICATIONS

International Search Report for PCT/EP2018/056845, dated Jun. 28, 2018.

*Primary Examiner* — Maria E Vazquez Colon
(74) *Attorney, Agent, or Firm* — Norton Rose Fulbright US LLP; Gerard Messina

(57) ABSTRACT

A method for scanning a scan angle, in which at least one electromagnetic beam is generated, the at least one electromagnetic beam is deflected along the scan angle, and the at least one electromagnetic beam, reflected at an object, is received and detected, wherein after at least one first electromagnetic beam, at least one second electromagnetic beam is generated and the second electromagnetic beam is generated with a lower energy than the first electromagnetic beam. A LIDAR device is also disclosed.

8 Claims, 5 Drawing Sheets

(56) References Cited

U.S. PATENT DOCUMENTS

2012/0154786 A1    6/2012   Gosch et al.
2019/0212454 A1*   7/2019   Petit .......................... G01S 7/48

FOREIGN PATENT DOCUMENTS

| EP | 2184616 | A2 |   | 5/2010  |          |
|----|---------|----|---|---------|----------|
| EP | 2395368 | A1 | * | 12/2011 | G01S 17/10 |
| EP | 2395368 | A1 |   | 12/2011 |          |
| EP | 2469296 | A1 |   | 6/2012  |          |
| JP | 2005205469 | A | * | 8/2005 |          |

* cited by examiner

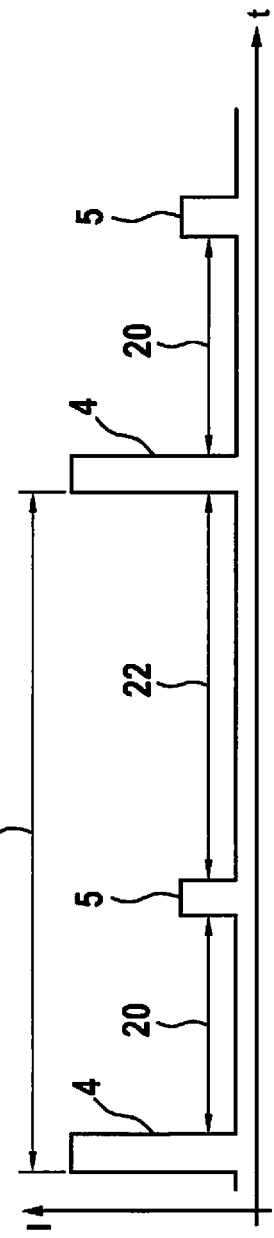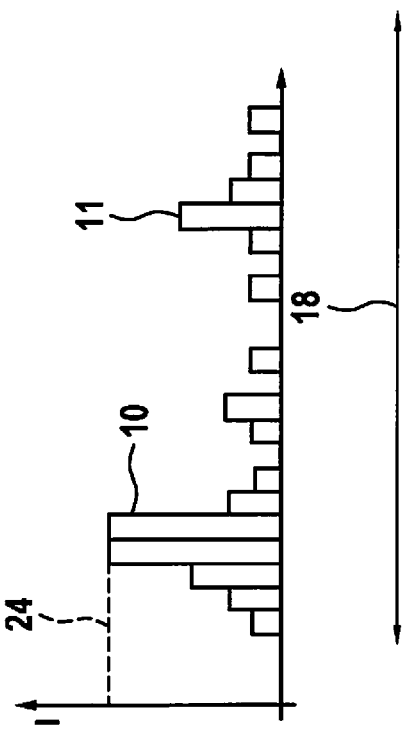

METHOD AND DEVICE FOR SCANNING A SOLID ANGLE

FIELD OF THE INVENTION

The present invention relates to a method for scanning a scan angle as well as a LIDAR device for scanning a scan angle.

BACKGROUND INFORMATION

Conventional LIDAR (Light Detection And Ranging) devices are pulsed direct time-of-flight systems which measure the time between emission and reception of a short, high-energy beam pulse or laser pulse. By knowing the velocity of light, a distance between an object and the LIDAR device may subsequently be ascertained based on the time or transit time of the beam.

Avalanche photodiodes or single photon avalanche diodes are usually used as detectors for receiving reflected beams. In order to scan or measure the largest possible ranges of 100-200 m accompanied at the same time by poor reflectivity of an object of less than 10%, within the limits of the eye-safety guideline, the necessary laser pulses may reach peak powers in the kilowatt range, depending on the system configuration. Because of the limited dynamic range of customary detectors, when beams are reflected at closer objects, the detectors quickly reach saturation. Consequently, the shape of the reception pulse may become distorted. As a result, the ascertainment of further measured quantities on the basis of the pulse shape, such as intensity, reflectivity, weather conditions, angle of the target relative to the LIDAR device may be impeded or prevented.

SUMMARY

An object of the present invention may be seen in providing a LIDAR device and a method which, in spite of a great range, are also able to register objects in a close range without oversaturation of a detector.

According to one aspect of the invention, a method is provided for scanning a scan angle, in which at least one electromagnetic beam is generated, and the at least one electromagnetic beam is deflected along the scan angle. The at least one electromagnetic beam reflected at an object is received and detected, at least one second electromagnetic beam being generated after at least one first electromagnetic beam, and the second electromagnetic beam being generated with a lower energy than the first electromagnetic beam.

Thus, at least one first electromagnetic beam is generated, and a short time later, at least one second weaker electromagnetic beam. Weaker in this context means that an intensity and an energy content of the at least one second electromagnetic beam are less than the intensity and the energy content of the at least one first electromagnetic beam. Preferably, the otherwise customary or possible 100% of energy of an electromagnetic beam is now split between the at least one first beam and the at least one second beam. For example, the at least one first beam may have 80-90% of the energy in order not to limit a maximum range of a LIDAR device too severely, and to ensure that no object is overlooked. On the other hand, the at least one second beam may have 10-20% of the energy. Consequently, with the aid of the at least one second beam, objects may also be detected with higher linearity. For instance, such objects may be objects which are positioned at a short distance from the LIDAR device and/or exhibit high reflectivity. Upon detection of the at least one first and high-energy beam, these objects would cause saturation of the detector.

According to one exemplary embodiment of the method, the energy of the at least one second electromagnetic beam is selected to be below a saturation of at least one detector. Thus, the at least one second beam may be prevented from causing saturation of the detector. Whereas in the case of the at least one first high-energy beam, the danger of saturation of the detector is high, especially in the case of close objects, nevertheless, owing to the at least one second beam, a meaningful measurement of the scanning range may be ensured.

According to another exemplary embodiment, the at least one electromagnetic beam is generated in pulsed fashion. Consequently, depending on the pulse duration, high intensity may be realized accompanied by constant energy content. Thus, several pulsed beams may also be generated within a brief period of time.

According to a further exemplary embodiment of the device, a delay time is initiated between the generating of the at least one first electromagnetic beam and the generating of the at least one second electromagnetic beam. The generating of the at least one second beam may thereby be delayed. Alternatively or additionally, several second beams may also be generated with a second delay time between the several second beams. For example, the second delay time may be less than the first delay time between the at least one first beam and the at least one second beam.

According to another exemplary embodiment, a ratio of intensity between the at least one first electromagnetic beam and the at least one second electromagnetic beam is varied. Consequently, the generated beams may be adapted flexibly and in situ to a situation. For instance, in the case of an automotive application in a heavily frequented neighborhood, a low ratio of intensity may be used, so that a close range may be scanned more effectively. On the other hand, on a turnpike, the largest possible ratio of intensity could be set between the two beams, so that a corresponding LIDAR device has the greatest range possible, and thus may also be used at higher speeds.

According to another exemplary embodiment of the method, the delay time between the at least one first electromagnetic beam and the at least one second electromagnetic beam is varied. In doing so, the delay time may be adapted particularly to a distance of the object from the LIDAR device, or at least to a beam source for generating at least one beam. With increasing distance, a generated beam requires more time to travel the distance to the object and back to the detector. Thus, the delay time may be adjusted in such a way that at least one reflected beam may be detected by the at least one detector within a defined period of time or within a defined measuring cycle. The delay time may be selected advantageously in such a way that at least one received reflected beam is not able to overlap timewise with a generated beam.

According to a further exemplary embodiment, the delay time is selected to be greater than a recovery time of a detector. Since especially when scanning objects at a short distance and/or of high reflectivity, a reflected beam of the at least one first high-energy beam can cause saturation of the detector, the at least one detector needs a period of time to again be ready to receive the at least one second beam. Alternatively, a detector may be selected which needs no recovery time.

According to a further aspect of the invention, a LIDAR device is provided to carry out a method according to one aspect of the invention. The LIDAR device has at least one beam source to generate at least one electromagnetic beam, a deflection unit to deflect the at least one generated electromagnetic beam along a scan angle and at least one detector to receive and detect at least one electromagnetic beam reflected at an object, the at least one beam source generating at least one first electromagnetic beam and at least one second electromagnetic beam, and the second electromagnetic beam having a lower energy than the first electromagnetic beam.

By generating at least one second weaker beam shortly after the at least one high-energy first beam, an operating range of the LIDAR device may be expanded. In the case of an object that is a small distance from the LIDAR device, a high-energy beam reflected at the object may bring about saturation of the at least one detector. High-energy beams which are reflected at objects with high reflectivity may likewise exceed the dynamic range of the detector. When the detector experiences saturation, a further evaluation of the at least one received beam may be impeded or prevented. In particular, an evaluation of further measured quantities based on a pulse shape of the beam like, for example, intensity, reflectivity, weather conditions, angle of the target relative to the LIDAR device and the like, may no longer be possible due to the saturation of the detector. It is hereby ensured that even when using a high-energy beam which is designed for the largest range possible, problematic objects may likewise be detected with a high linearity.

According to one exemplary embodiment, a variable delay time is implemented between the at least one first generated beam and the at least one second generated beam. Depending on the detector, a recovery time must be taken into account after the saturation. The delay time is thus able to ensure that the at least one second beam may be detected normally by the detector. Negative effects of a saturated detector may thereby be circumvented. Since the at least two beams have the same time base and may be sorted into the same histogram, no additional memory is necessary in the LIDAR device.

According to another exemplary embodiment, a ratio of intensity between the at least one first electromagnetic beam and the at least one second electromagnetic beam is variable. The ratio of intensity between the at least one first beam and the at least one second beam may be determined as a function of an application environment of the LIDAR device. For instance, the ratio of intensity may be 90% to 10%, 80% to 20%, 50% to 50% and the like. Particularly in the case of applications which require a large range, the greatest possible percentage of energy may be applied to the at least one first beam. Moreover, in addition to the selection of the delay time, the ratio of intensity may be selected depending on a close range to be detected like, e.g., less than 50 m. After each measuring cycle, which is made up of at least two beams generated separately from each other by the delay time and received again, the delay time and/or the ratio of intensity may be changed.

Hereinafter, preferred exemplary embodiments of the present invention are explained in greater detail on the basis of highly simplified schematic representations.

BRIEF DESCRIPTION OF THE DRAWINGS

FIG. 2a shows a schematic sequence of generated beams in accordance with a method according to a first exemplary embodiment.

FIG. 2b shows a schematic intensity spectrum of detected beams in accordance with a method according to the first exemplary embodiment.

DETAILED DESCRIPTION

Figure 1:
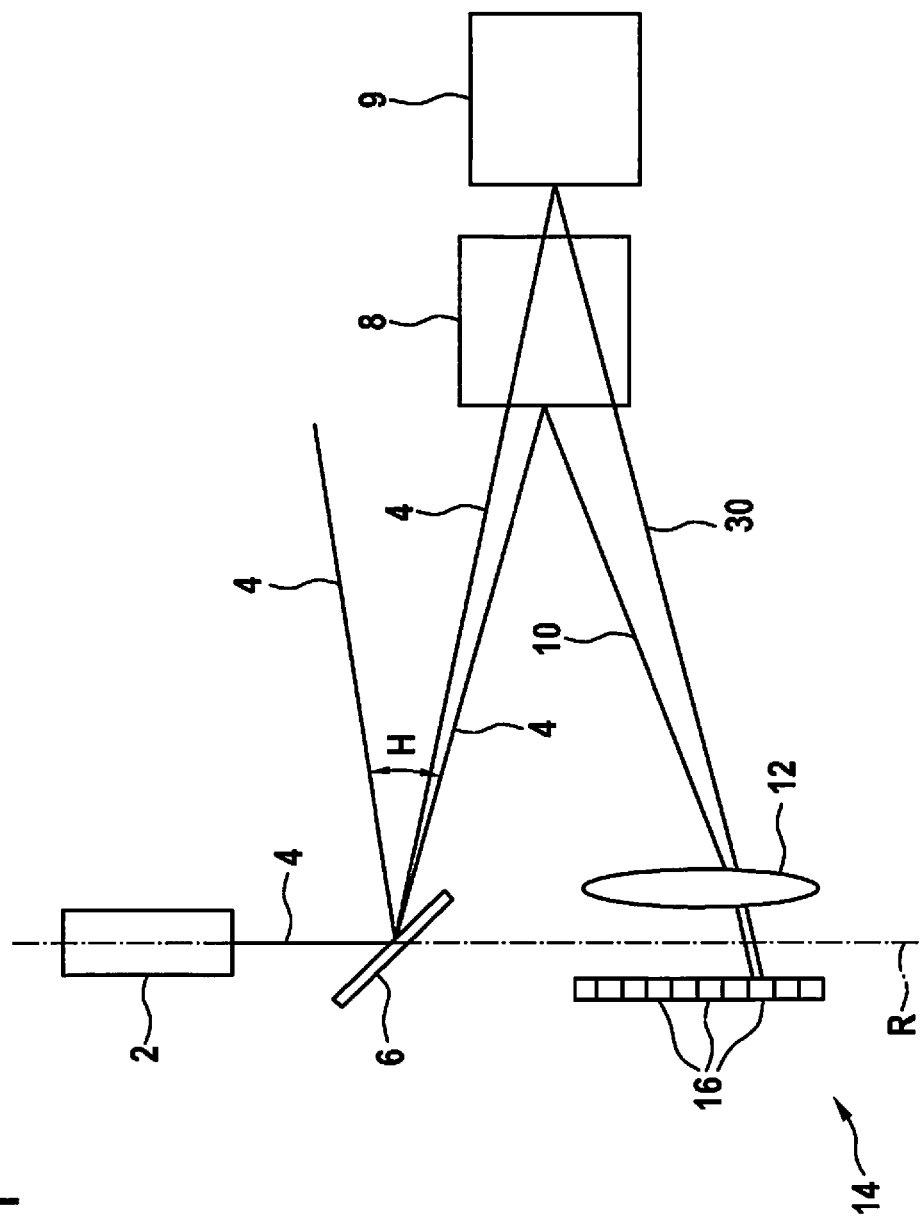
FIG. 1 shows a schematic representation of a LIDAR device according to a first exemplary embodiment.

In the figures, the same structural elements in each case have the same reference numerals.

FIG. 1 shows a first exemplary embodiment of a LIDAR device 1. LIDAR device 1 has a beam source 2 for generating at least one electromagnetic beam 4. Beam source 2 according to the example is a laser 2 which generates beams 4 in a pulse shape. According to the exemplary embodiment, laser 2 is used to generate a beam 4 with a wavelength in the non-visible infrared range. For instance, the wavelength may be greater than 800 nm. Beam 4 generated by laser 2 is deflected by a deflection unit 6 or a rotatable mirror 6. In this case, mirror 6 is pivotable along an axis of rotation R. Thus, mirror 6 is able to deflect generated beam 4 along a defined scan angle H. In addition, mirror 6 is pivotable orthogonally to horizontal scan angle H, and therefore covers a vertical scan angle V. Consequently, LIDAR device 1 is able to scan a solid angle W=V×H and locate possible objects 8, 9 positioned in this solid angle W. The at least one generated beam 4 is at least partially reflected by objects 8, 9, and becomes reflected or incoming beam 10, 30. Reflected beam 10, 30 is received by a receiving optical system 12 and directed to a detector 14. Detector 14 is made up of a plurality of detector cells 16, which according to the exemplary embodiment, are single photon avalanche diodes.

FIG. 2a shows a schematic sequence of generated beams 4, 5 in accordance with a method according to a first exemplary embodiment. Specifically, an intensity I of a first generated beam 4 and of a second generated beam 5 is illustrated against a time t. Generated beams 4, 5 are generated in pulse form and form a measuring cycle 18. Within measuring cycle 18, generated beams 4, 5 are set apart from each other in time by a delay time 20. Between second generated beam 5 and a next measuring cycle 18, a second interruption time 22 is likewise present, which belongs to first measuring cycle 18. A decay phase of beam source 2 may be realized by second interruption time 22. Moreover, the entire energy content delivered over measuring cycle 18 per unit of time t may be controlled by way of interruption time 22.

FIG. 2b shows a schematic intensity spectrum of detected beams 10, 11 in accordance with the method according to the first exemplary embodiment. In this case, in particular the intensity distribution recorded over time by a detector cell 16 is illustrated. The time section shown corresponds to a first time span from measuring cycle 18. First detected beam 10 has an intensity I so high that detector cell 16 reaches a state of saturation 24 and, so to speak, becomes overexposed. After a brief period of time, second beam 11 is detected. Second beam 11 was generated with a lower energy content, and after being reflected at object 8, exhibits an intensity I which lies below state of saturation 24 of detector cell 16.

Figure 3A:
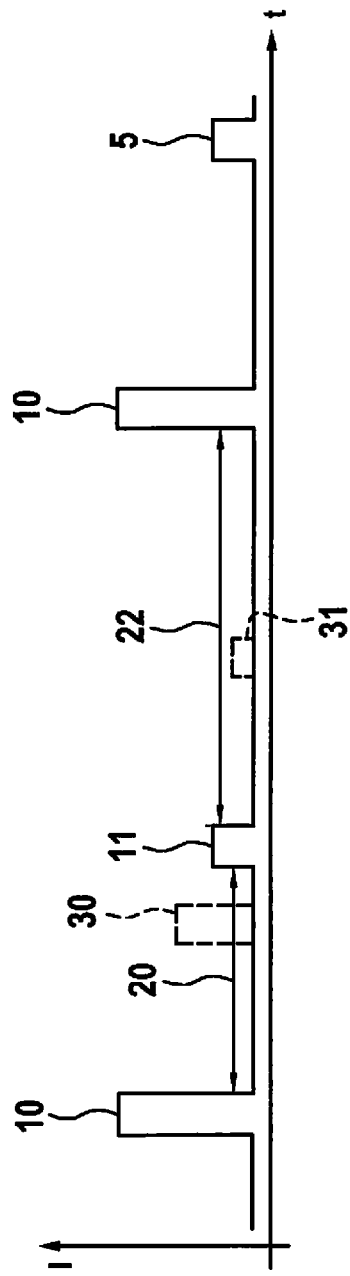
FIG. 3a, 3b show a schematic sequence of generated and received beams in accordance with a method according to the first exemplary embodiment.
Figure 3B:
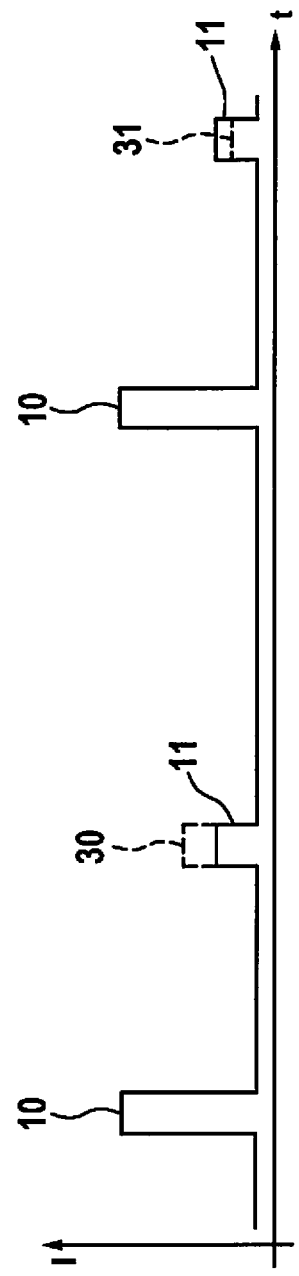

FIGS. 3a and 3b show schematic time sequences of reflected and detected beams 10, 11, 30, 31 that were recorded by at least one detector cell 16 of detector 14 within a timeframe t. In this case, measuring cycle 18 already described in FIG. 2a was used to detect two objects 8, 9. Beams 10, 11 reflected by a first object 8 and beams 30, 31 reflected by a second object 9 have been recorded here within the same temporal intensity variation I. Consequently, no separate time thread is necessary for evaluating detected beams 10, 11, 30, 31. An evaluation process may thus be accelerated. For instance, FIG. 3b shows that detected beams 10, 11, 30, 31 of two different objects 8, 9 may overlap. In particular, this is the case when a distance between two objects 8, 9 is present that corresponds to a transit time of generated beams 4, 5, and according to which delay time 20 is present. Thus, according to the method, in a next or next but one measuring cycle 18, delay time 20 may be varied in order to permit a clear temporal differentiation of intensities I of detected beams 10, 11 of first object 8 and of detected beams 30, 31 of second object 9.

Figure 4A:
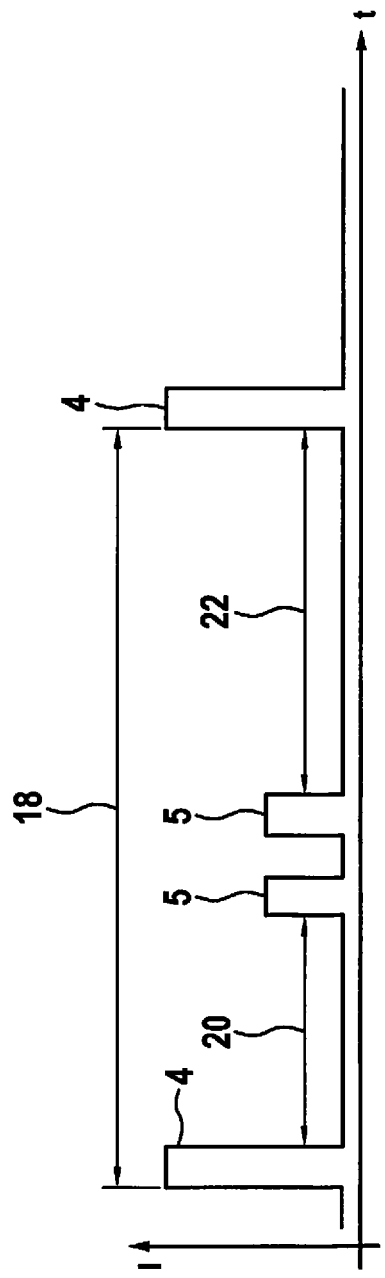
FIG. 4a shows a schematic sequence of generated beams in accordance with a method according to a second exemplary embodiment.

FIG. 4a shows a schematic sequence of generated beams 4, 5 in accordance with the method according to a second exemplary embodiment. According to the example, beam source 2 generates a first high-energy beam 4 in the form of a pulse and two further second weaker-energy beams 5. A delay time 20 is likewise present between first generated beam 4 and the two second generated beams 5. The delay time may be implemented variably here, as well, depending on measuring cycle 18, and may be adapted to a type or distance of object 8, 9 or to a number of anticipated objects 8, 9. After the two second weaker-energy beams 5 have been generated, no further beams 4, 5 are generated for a second delay time or interruption time 22. Rather, interruption time 22 may be used as decay phase of beam source 2. Depending on the duration of respective beams 4, 5, delay time 20 and interruption time 22 may be adapted to a defined measuring cycle 18. Thus, the energy content delivered by generated beams 4, 5 per unit of time t may also be adapted. According to the exemplary embodiment, the first generated beam has 70% of the energy content in measuring cycle 18 and the two second generated beams 5 each have 15% of the energy content.

Figure 4B:
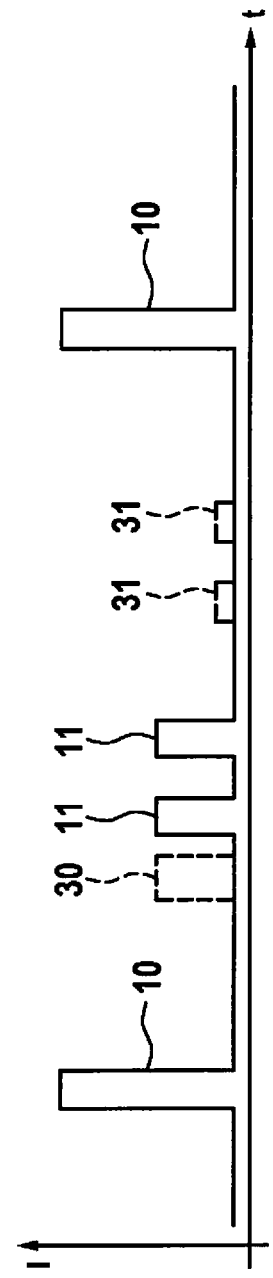
FIG. 4b, 4c show a schematic sequence of generated and received beams in accordance with a method according to the second exemplary embodiment.
Figure 4C:
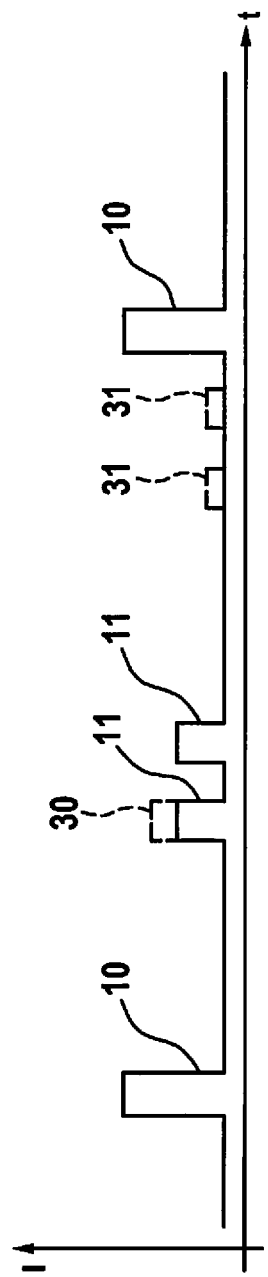

FIG. 4b shows measuring cycle 18, described in FIG. 4a, with beams 10, 11 of first object 8 received and detected by at least one detector cell 16 of detector 14, and detected beams 30, 31 of second object 9. Delay time 20 is adjusted to the distances of objects 8, 9 in such a way that the pulses of beams 10, 11, 30, 31 recorded within a time axis t do not overlap or superimpose. Thus, each individual pulse of beams 10, 11, 30, 31 may be clearly identified and evaluated. FIG. 4c shows beams 10, 11, 30, 31, detected, e.g., analogously to FIG. 4b, from two objects 8, 9 which have a distance to each other that is able to be traveled by beams 10, 11, 30, 31 within a transit time on the order of delay 20. Consequently, detected beams 10, 11, 30, 31 of both objects 8, 9 have superimpositions or overlaps in some areas. Detected beams 10, 11, 30, 31 are thus able to be evaluated only partially. In order to avoid this, delay time 20 may be defined and altered continuously over several measuring cycles 18, so that a superimposition of several detected beams 10, 11, 30, 31 becomes recognizable, or detected beams 10, 11, 30, 31 no longer superimpose. Alternatively, every second measuring cycle 18 may be recorded in a separate time axis, for example, so that a superimposition of detected beams 10, 11, 30, 31 may be prevented.

What is claimed is:

1. A method for scanning a scan angle, comprising:
   generating at least one first electromagnetic beam and at least one second electromagnetic beam, one after the other, by a laser of a LIDAR device;
   deflecting the at least one first electromagnetic beam and the at least one second electromagnetic beam one after the other, along the scan angle; and
   receiving and detecting at least one reflected electromagnetic beam reflected by at least one object positioned in the scan angle, wherein the at least one reflected electromagnetic beam is an at least partial reflection of: (i) the at least one first electromagnetic beam, or (ii) the at least one second electromagnetic beam;
   wherein, in each of a plurality of measuring cycles of the LIDAR device:
      the at least one first electromagnetic beam is generated, and after a temporal delay after the at least one first electromagnetic beam is generated, the at least one second electromagnetic beam is generated, and
      the at least one second electromagnetic beam is generated with a lower energy than the at least one first electromagnetic beam; and
   wherein after each of the measuring cycles, a ratio of an intensity of the at least one first electromagnetic beam to an intensity of the at least one second electromagnetic beam is varied.

2. The method as recited in claim 1, wherein the lower energy of the at least one second electromagnetic beam is selected to be below a saturation of at least one detector.

3. The method as recited in claim 1, wherein at least one of the at least one first electromagnetic beam and the at least one second electromagnetic beam is generated in pulsed fashion.

4. The method as recited in claim 1, further comprising initiating a delay time between the generating of the at least one first electromagnetic beam and the generating of the at least one second electromagnetic beam.

5. The method as recited in claim 1, further comprising varying a delay time between the at least one first electromagnetic beam and the at least one second electromagnetic beam.

6. The method as recited in claim 5, wherein the delay time is selected to be greater than a recovery time of a detector.

7. A LIDAR device, comprising:
   at least one beam source to generate, in each of a plurality of measuring cycles, at least one first electromagnetic beam and at least one second electromagnetic beam, one after the other, wherein the at least one beam source is at least one laser of the LIDAR device;
   a deflection unit to deflect the at least one first electromagnetic beam and the at least one second electromagnetic beam one after the other along a scan angle; and
   at least one detector to receive and detect at least one reflected electromagnetic beam reflected by at least one object positioned in the scan angle, wherein the at least one reflected electromagnetic beam is an at least partial reflection of: (i) the at least one first electromagnetic beam, or (ii) the at least one second electromagnetic beam;
   wherein, in each of the plurality of measuring cycles of the LIDAR device:
      the at least one beam source generates the at least one first electromagnetic beam, and generates the at least one second electromagnetic beam after a temporal delay after generating the at least one electromagnetic beam, and wherein the at least one second electromagnetic beam has a lower energy than the at least one first electromagnetic beam; and wherein after each of the measuring cycles, a ratio of an intensity of the at least one first electromagnetic beam to an intensity of the at least one second electromagnetic beam is varied.

8. The LIDAR device as recited in claim 7, wherein a variable delay time is implemented between the at least one first electromagnetic beam and the at least one second electromagnetic beam.

* * * * *